United States Patent
Creamer et al.

(10) Patent No.: US 7,516,443 B2
(45) Date of Patent: *Apr. 7, 2009

(54) PERFORMING TESTS WITH GHOST AGENTS

(75) Inventors: Thomas E. Creamer, Boca Raton, FL (US); Bill H. Hilf, La Habra, CA (US); Peeyush Jaiswal, Boca Raton, FL (US); Michael H. Mirt, Deerfield Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 743 days.

This patent is subject to a terminal disclaimer.

(21) Appl. No.: 10/666,350

(22) Filed: Sep. 19, 2003

(65) Prior Publication Data

US 2005/0076192 A1    Apr. 7, 2005

(51) Int. Cl.
*G06F 9/44* (2006.01)
*G06F 9/46* (2006.01)
*G06F 15/16* (2006.01)

(52) U.S. Cl. .............. 717/124; 717/127; 717/103; 718/100; 718/105; 709/201; 709/202

(58) Field of Classification Search .......... 717/100, 717/124, 127, 131, 101, 103, 126, 128; 709/202, 709/222–224, 201, 217, 218; 718/1, 100, 718/104, 105

See application file for complete search history.

(56) References Cited

U.S. PATENT DOCUMENTS

| | | | |
|---|---|---|---|
| 5,515,367 A | 5/1996 | Cox, Jr. et al. | |
| 5,655,081 A | 8/1997 | Bonnell et al. | |
| 5,802,296 A | 9/1998 | Morse et al. | |
| 5,812,780 A * | 9/1998 | Chen et al. | 709/224 |
| 5,966,441 A | 10/1999 | Calamera | |
| 5,974,567 A | 10/1999 | Dickson, Jr. et al. | |
| 6,038,399 A | 3/2000 | Fisher et al. | |
| 6,108,697 A | 8/2000 | Raymond et al. | |
| 6,108,703 A | 8/2000 | Leighton et al. | |
| 6,122,664 A * | 9/2000 | Boukobza et al. | 709/224 |
| 6,229,533 B1 | 5/2001 | Farmer et al. | |
| 6,269,330 B1 * | 7/2001 | Cidon et al. | 714/43 |
| 6,282,697 B1 * | 8/2001 | Fables et al. | 717/107 |
| 6,389,462 B1 | 5/2002 | Cohen et al. | |
| 6,460,070 B1 * | 10/2002 | Turek et al. | 709/202 |

(Continued)

OTHER PUBLICATIONS

Fukuda M., Tanaka Y., Suzuki N., Bic L.F., Kobayashi S.; A mobile-agent-based PC grid; Autonomic Computing Workshop, 2003; Publication Date: Jun. 25, 2003; pp. 1-9.*

Brann, J.J., et al., "Local Area Network Protocol for Autonomous Control of Attached Devices", IBM Tech. Disl. Bul., vol. 33, No. 2, pp. 288-294, (Jul. 1990).

"Ghost and Imagecast IC3, An Imaging Performance Comparison", ZDTag, (Jan. 1999).

(Continued)

*Primary Examiner*—Meng-Ai An
*Assistant Examiner*—Abdullah Al Kawsar
(74) *Attorney, Agent, or Firm*—Akerman Sentertfitt

(57) ABSTRACT

A testing method can include the step of identifying a host within a grid environment, wherein the host is a software object. A ghost agent can be associated with the host. The actions of the host can be replicated within the ghost agent. At least one test routine can be loaded into the ghost agent. The test routine can be executed within the ghost agent. Moreover, the executing step can utilize data gathered from the replicated actions. Test output can be generated from the test routine.

15 Claims, 6 Drawing Sheets

U.S. PATENT DOCUMENTS

| | | | | |
|---|---|---|---|---|
| 6,513,159 | B1 | 1/2003 | Dodson | |
| 6,681,243 | B1* | 1/2004 | Putzolu et al. | 709/202 |
| 7,082,604 | B2* | 7/2006 | Schneiderman | 718/100 |
| 2002/0143854 | A1* | 10/2002 | Pleisch et al. | 709/202 |
| 2004/0064548 | A1 | 4/2004 | Adams et al. | |

OTHER PUBLICATIONS

Avery, M., "Symantec Ghost 6.5 Overcomes Weaknesses of Predecessor", Netowrking Computing, (Oct. 2, 2000).

"How to Troubleshoot a Ghost Network Boot Disk", Symantec, (Nov. 27, 2000.

* cited by examiner

PERFORMING TESTS WITH GHOST AGENTS

BACKGROUND

1. Field of the Invention

The present invention relates to the field of computer software and, more particularly, to testing applications within a grid environment.

2. Description of the Related Art

A grid computing environment is a distributed computing environment where computing, application, storage, and/or network resources can be shared across geographically disperse organizations. An ideal grid computing environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid computing environment, such as Avaki's data grid from Avaki of Burlington, Me. and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

A grid computing environment can include multiple applications. Each application can include a set of computing resources that performs a series of related tasks. Examples of applications include, but are not limited to, word processors, database programs, Web browsers, development tools, drawing applications, image editing programs, and communication programs. The various computing resources for one application can be distributed across several different grids within a grid computing environment, wherein each grid can contain a myriad of diverse hardware components, such as communication lines, networking routers, servers, workstations, peripherals, intranets, and the like.

One problem with existing grid computing environments relates to testing application changes and/or new application implementations before deployment within an operational grid environment. Testing can be especially important within a grid environment because problems with one grid-enabled application can have cascading effects upon other applications. That is, since many different grid-enabled applications can share pooled resources, one malfunctioning application feature that overly consumes needed resources can affect multiple applications that share the commonly utilized resources. The interdependencies that exist among applications in a grid environment, however, make realistic tests of individual applications extremely difficult.

Conventional testing solutions involve extrapolation and have proven inadequate in modeling the complexities of operational grid behavior. Extrapolation testing methods attempt to simulate operational conditions using small, finite, measurable increments of system resources. The measurable increments are applied to an extrapolation algorithm in order to determine projected computing resource consumption. Extrapolation algorithms can then compare these projected consumptions with estimated computing resource availability. While extrapolation testing methods are useful for characterizing simplistic grid environments, extrapolation methods are inadequate for complex ones. For example, extrapolation testing methods cannot accurately determine behavior of multiple applications interoperating within several grids, especially in the case where each experiences usage peaks and troughs.

SUMMARY OF THE INVENTION

The present invention provides a method, a system, and an apparatus for performing tests within a grid environment. More specifically, the invention can identify an application that includes multiple components located within different locations of the grid environment. Each of the components can include one or more hosts, each host being a software object. Test routines can be constructed for particular ones of the hosts. Additionally, ghost agents can be associated with the hosts. The test routines can be loaded into the ghost agents and executed therein. Test output can then be conveyed from the ghost agents to a centralized location. In one embodiment, an interface can be provided to trigger the execution of the test routines regardless of the location of the ghosts in which the test routines are loaded. In another embodiment, comparisons between the executed test routines and the replicated actions within the ghost agents can be made in order to determine the success or failure of the tests.

One aspect of the present invention can include a testing method including the step of identifying a host within a grid environment, wherein the host is a software object. A ghost agent can be associated with the host. The actions of the host can be replicated within the ghost agent. At least one test routine can be loaded into the ghost agent. The test routine can be executed within the ghost agent. Moreover, the executing step can utilize data gathered from the replicated actions. Test output can be generated from the test routine. The host can move within the grid environment and the ghost agent can move in accordance with movement of the host. Movement in a grid environment refers to the movement from one grid component to another component within a grid and/or movement from one grid to a different grid of the grid environment. In one embodiment, multiple hosts can be selected and a ghost agent can be associated with each selected host. Each ghost can then be loaded with a test routine, which can be executed to generate test output.

Additionally, test routines can be prevented from operationally executing in the grid environment. In one embodiment, a location for recording test output can be identified and test output can be conveyed to the identified location. The identified location can be external to the ghost agent. A test command can also be received from a source external to both the host and the ghost agent. At least one test operation can be performed within the ghost agent responsive to the test command. In another embodiment, the test routines can be developed to test a specific application. In such an embodiment, load conditions for at least one different application can be simulated while the specific application is being tested.

In yet another embodiment, results from the replicated actions can be compared with results from executing the test routines. Further, operational metrics from the replicated actions can be compared with operational metrics resulting from the execution of the test routines. Operational metrics can refer to performance and/or load metrics.

Another aspect of the present invention can include a testing method that includes the step of identifying an application domain. The application domain can include multiple hosts disposed within one or more locations within a grid environment, where each host can be a software object. A multitude of test routines written for specific hosts can be identified. The test routines can be loaded into ghost agents. The ghost agents can also be associated with hosts that correspond to the loaded test routines. The test routines can be executed. Test output can be generated and conveyed to a centralized data store. Further, a test interface can be provided for testing the application domain. The test interface can trigger the execution of the test routines disposed within ghost agents.

The actions that occur within each host can be replicated to be used by the associated ghost agent. Aspects of the executed test routines can be compared with aspects of the replicated actions. Additionally, a sequence in which the test routines are to be executed can be determined. The test routines can be executed in accordance with the determined sequence. In one embodiment, at least one message can be conveyed between one of the ghost agents and another of the ghost agents. For example, one ghost agent can send a message containing output from an executed test routine. Another ghost agent can receive the message and use data extracted from the message as test routine input.

Another aspect of the present invention can include a ghost agent that includes an interface, a test engine, a ghost controller, a ghost identifier, and/or a ghost log. The ghost agent can automatically move within the grid environment to follow movements of the host. The interface can associate the ghost agent with a host. The test engine can execute test routines. The ghost controller can manage interactions between the ghost agent and a grid environment. The ghost identifier can identify the ghost agent to components within the grid environment. The ghost log can record test output. Additionally, the ghost agent can include a means for disassociating the ghost agent from the host. The ghost agent can also include a means for associating the ghost agent with a different host.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a method, a system, and an apparatus for testing an application domain. More specifically, a multitude of software units that implement various application domain features can be identified, where each such software unit can be referred to as a host. Individual test routines can be constructed for one or more hosts. The test routines can be loaded within ghost agents that are deployed into the grid environment. Each ghost agent can associate itself with a suitable host. Data can be gathered from the host and can be inputted into the associated ghost agent. The inputted data can be used when executing the loaded test routines. Additionally, output from the test routines can be conveyed to a centralized test output data store. Further, a single test interface can be utilized to manage the test routines in a location independent fashion.

As used herein, a ghost agent can be a self-managing, self-identifying software object capable of performing predefined tasks in a self-sufficient manner. Any suitable technique can be used to attach the ghost agent to the host including, but not limited to, debugging attachment techniques, system calibration techniques, hardware performance testing techniques, and similar binding methodologies.

Ghost agents can be used in either an active or a passive fashion. A ghost agent that does not have an operational effect upon the grid environment can be referred to as a passive or "read-only" ghost agent. A passive ghost agent can passively record the actions of a host and/or execute test routines that have no operationally significant effect upon a production environment in which actions of the hosts are executed. Another type of ghost agent, an active ghost agent, can perform actions that have an operational effect upon the grid environment. For example, an active ghost agent can be used to induce a fault state so that fault tolerance features of an application can be tested. In general, an active ghost agent can selectively prevent a host from performing one or more actions, can delay the actions of a host, can modify one or more host actions, and/or can initiate new actions.

Figure 1:
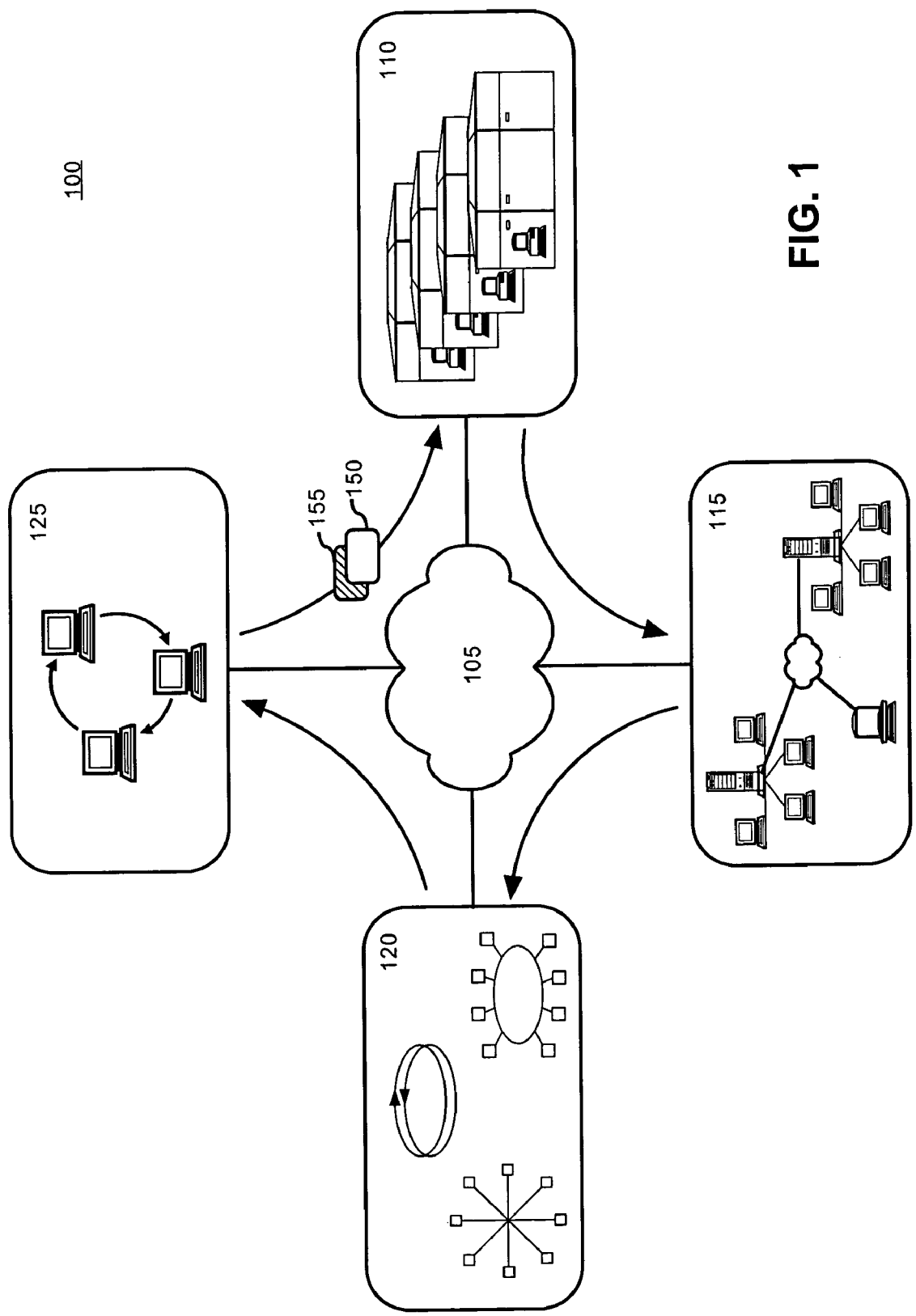
FIG. 1 is a schematic diagram illustrating an exemplary grid environment enabled for ghost agents and hosts in accordance with the inventive arrangements disclosed herein.

FIG. 1 is a schematic diagram illustrating an exemplary grid environment 100 enabled for ghost agents and hosts. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

As used herein, computing resources can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The grid environment 100 infrastructure can include components that utilize any hardware platform, operating system, storage scheme, and software resource. In order to be integrated within the grid environment 100, each computing component can be communicatively linked to the grid environment 100 through the network 105. Each computing component can also adhere to the standards and protocols defined within the architecture of the grid environment 100. The grid environment 100 can include one or more grids, such as grids 110, 115, 120, and 125, communicatively linked to one another through a network 105. Each grid can represent a grouping of physically differentiable hardware resources.

The grid 110 can include a multitude of mainframe or supercomputers. The grid 115 can include several local area networks, workgroups, and computing arrays. The grid 120 can include computing resources arranged according to any topography including, but not limited to, star topographies, Fiber Distributed Data Interface (FDDI) rings, token rings, and the like. The grid 125 can include one or more peer-to-peer networks. One of ordinary skill in the art can appreciate that the invention is not to be limited in this regard, that any hardware resources, topography, and software can be included in the grid environment 100, and that such arrangements are contemplated herein.

Host 150 can be a software object capable of moving within the grid environment 100. For example, the host 150 can move from grid 110 to grid 115 or from grid 120 to grid 125 to grid 115. The host 150 can also move from one location within a grid to another location. For example, the host 150 can move from one workgroup in grid 115 to a different workgroup in grid 115. Whenever the host 150 moves, the associated ghost agent 155 can move accordingly. Thus, the ghost agent 155 can perform testing operations related to the associated host 150 in a location independent fashion.

One illustrative example of ghost agents 155 operating within a grid environment 100 can relate to a Massive Multi-Player Gaming (MMPG) system. Each player of the MMPG system can be represented by a host 150 that responds to user instructions and interacts with the gaming environment. While playing the MMPG, players can move from one game play area to another, thereby moving the host 150 within the grid environment 100. Ghost agents 155 can be attached to selected players and can move within the grid environment 100 according to the movements of the host 150. The ghost agents 155 can include one or more test routines that can be triggered from a test interface and/or based upon actions of the attached players.

For example, if a number of players experience erratic behavior when campaigning in a suspect area of the MMPG, ghost agents 155 can be attached to players at the onset of adventures into the suspect area. The ghost agents 155 can include test routines designed to identify problems. Test routines can also be loaded into ghost agents 155 that represent proposed solutions to the problems being experienced. That is, the test routines can function as replacement code for identified code segments. Whenever a player performs an action, an appropriate test routine for that action can be executed by the ghost agent 155. Necessary parameters for the test routine can be automatically generated based upon the actions of the players within the MMPG.

The test routines executed within the ghost agent 155 can have substantially no effect on the actions executed by the host 150. Accordingly, game play for the MMPG for players with ghost agents 155 will be approximately the same as game play for players without ghost agents 155. Additionally, testing within the ghost agent 155 is not always halted whenever an error is encountered. Instead, the error can be recorded as test output and the test routines can continue to be executed responsive to player activity. Of course, the above MMPG example is just one possible application within which tests can be performed within ghost agents 155 and the invention is not limited in this regard.

Figure 2:
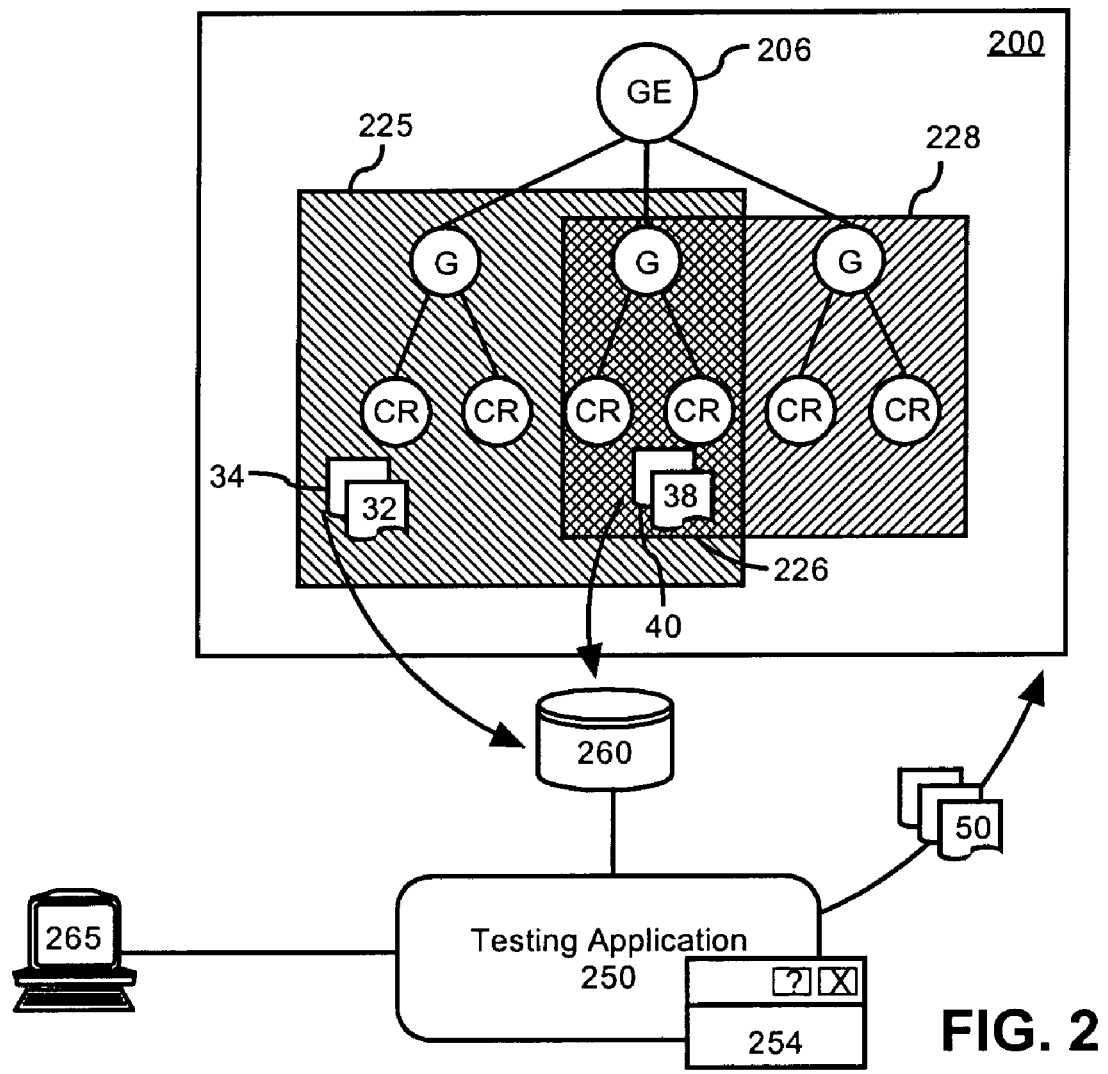
FIG. 2 is a schematic diagram illustrating a system in which a centralized testing application can test grid-based applications in accordance with the inventive arrangements disclosed herein.

FIG. 2 is a schematic diagram illustrating a system in which a centralized testing application 250 can test grid-based applications in accordance with the inventive arrangements disclosed herein. The system can include a testing application 250, a testing computer 265, and a test data store 260. The testing application 250 can be a software development tool configured to test applications within test grid-environments, and within production grid environments. The testing application 250 can also test software installed within a testing computer 265, which can be a stand-alone device not deployed within a grid environment 200. The testing application 250 can include a test interface 254 that allows software developers and other users to access the functionality of the testing application 250.

When the testing application 250 operates with the grid environment 200, test commands 50 can be directed toward designated ghost agents 34 and 40 disposed throughout the grid environment 200. The test commands 50 can trigger the ghost agents 34 and 40 to execute test operations. The test operations can result in test output which can be conveyed to the test data store 260. The test application 250 can access the test data store 260 and retrieve the test output.

The grid environment 200 is illustrated as a series of nodes and applications spanning these nodes. The grid environment 200 includes a root node 206. This root node, labeled "GE" for grid environment. The root node 206 can include one or more different grids, where each grid is represented by a node labeled "G." Each grid can further provide one or more computing resources, represented by nodes labeled "CR." The computing resources can be pooled into the resource pool and be utilized by various grid users on demand.

Application domains 225 and 228 can exist within the grid environment 200, each functioning as a "virtual application." Unlike traditional applications that generally reside on a single server, application domains 225 and 228 can physically span across several grids and grid components, yet logically function as a single application having a single user interface. Each application domain can utilize several different computing resources. Additionally, a set of computing resources can be utilized by more than one application domain. For example, application domain 225 and application domain 228 share a portion of computing resources labeled shared segment 226. Exemplary types of application domains 225 and 228 can include productivity applications, entertainment applications, development applications, office applications, utility applications, multimedia applications, data management applications, graphic design applications, and the like.

Application domains 225 and 228 can utilize hosts 32 and 38 to perform application specific actions. Ghost agents 34 and 40 can replicate and record these actions. Further, ghost agents 34 and 40 can include test routines that can be passively executed as well as actively executed.

In operation, a user can utilize the test interface 254 to access the testing application 250. Once an instance of the test interface 254 is open, the application domain 225 can be chosen from a selection of application domains. The procedures, methods, parameters, and graphical user interface (GUI) views of the application domain 225 can be presented within the test interface 254. The user can select a presented software object and generate a test routine for it. Subsequently, the generated test routines can be executed. For example, a test routine can include a driver and a stub written for a particular procedure. The test routine can be executed in place of or in addition to the procedure for which it was written.

In one embodiment, test routines written using the testing application 250 can be enabled when the application domain 225 is executed in a test mode, yet can be disabled when the application domain 225 is executed in a production mode. Further, the test mode can refer to actions executed by the ghost agents 34 and 40. The production mode can refer to actions executed by the hosts 32 and 38. Host actions can be executed by the hosts 32 and 38 at the same time that replicated actions, which can be modified by test routines, are executed by the ghost agents 34 and 40. Accordingly, the application domain 225 can simultaneously operate in a production mode and a test mode without the test mode interfering significantly with the production mode. When actions are executed in both a production mode and a test mode, production mode input, actions, and output can be compared with test mode equivalents.

Figure 3:
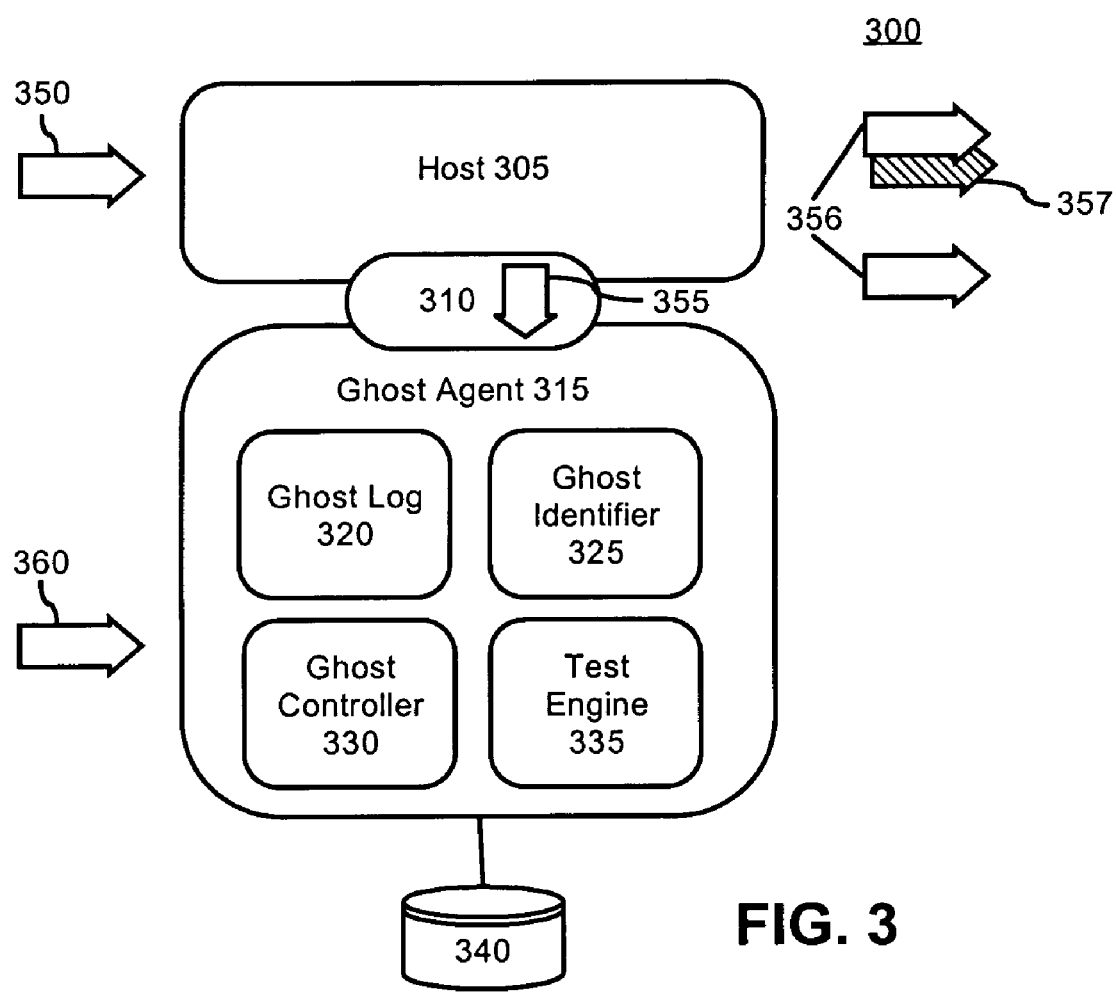
FIG. 3 is a schematic diagram illustrating a host and a ghost agent within a grid environment in accordance with the inventive arrangements described herein.

FIG. 3 is a schematic diagram illustrating a host 305 and a ghost agent 315 within a grid environment 300 in accordance with the inventive arrangements described herein. The host 305 can be any definable software unit within the grid environment 300 that can receive input 350 and execute actions 356. The input 350 can include messages of any type conveyed to the host 305, such as keyboard input, procedural calls, and the like. The actions 356 can be relatively high-level actions as well as low-level actions. High-level actions can include calls to software routines that can contain one or more external procedural calls. Low-level actions can include hardware device calls and the execution of one or more processes or threads.

The ghost agent 315 can be associated or bound to the host 305 though the ghost interface 310. The ghost interface 310 can generate replicated actions 355 that are copies of the actions executed by the host 305, using any of a variety of suitable techniques. For example, techniques used by software debugging programs to attach monitors to running programs in order to evaluate system behavior and step through code can be used by the ghost interface 310. Alternatively, techniques used by system calibration and hardware performance testing utilities can be used by the ghost interface 310 to bind the ghost agent 315 with the host 305. Further, operating system level commands, tools, and functions analogous or similar to the UNIX commands "strace" and "ptrace," can potentially be used by the ghost interface 310 to bind the host 305 with the ghost agent 315. Strace is a commonly used system call trace, i.e. a debugging tool that prints out a trace of all the system calls made by another process and/or program. Ptrace is a commonly used system call that enables one process to control the execution of another. Ptrace also enables a process to change the core image of another process.

The ghost agent 315 can manipulate the replicated actions 355 in order to utilize data gathered from the replicated actions 355 when executing test routines. Additionally, the replicated action 355 can be a passive or "read only" action that has no operational effect upon the grid environment 300. Accordingly, the passive action can be stored and not rebroadcast or sent into the grid environment 300 to be executed. The ghost agent 315 can also generate one or more active actions 357 that are executed within the grid environment 300. Active actions 357 can be used to place a system in a selected state so that the selected state can be tested. While active actions 357 can be commonly used by ghost agents 315 disposed within a test segment of the grid environment 300, active actions 357 can also be used within production segments of the grid environment 300. When used within production segments, however, care must be taken to assure the active actions 357 are not harmful to users of the grid environment 300.

In one embodiment, the ghost agent 315 can receive control signals 360 from an external source. The control signals can include messages used for testing as well as general messages used to control the ghost agent 315. For example, the control signal 360 can specify a test routine that is to be executed. Additionally, the control signal 360 can synchronize the execution of different, sequentially executed test routines disposed within different ghost agents 315. Further, the control signal 360 can include input for one or more test routines and can adjust settings relating to the test routines. Alternatively, control signals can cause a ghost agent 315 to associate and/or disassociate with a host 305, can alter the level of logging performed by the ghost agent 315, can cause the ghost agent 315 to terminate, and can similarly control the ghost agent 315.

The ghost agent 315 can include a test engine 335, a ghost log 320, a ghost identifier 325, and a ghost controller 330. The test engine 335 can load test routines into the ghost agent 315, can execute the test routines, and can generate test output. The execution of the test routines can result from receiving test commands that trigger one or more test operations. Test routines can also be automatically executed based upon the occurrence of a monitored event. For example, if a particular replicated action 355 is received, the test engine 335 can responsively execute a test routine.

When executing test routines, the test engine 335 can analyze, manipulate, and extract data from the replicated actions 355. For example, a test routine may require one or more parameters that can be extracted from one or more replicated actions 355. Test routines can also be executed in combination with other test routines and/or replicated actions 355.

For example, a replicated action 355 can trigger three sequentially executed procedures specified as modules A, B, and C. A test routine called module $B^{TEST}$ can be a replacement for module B. That is, the test engine 335 can replace module B with module $B^{TEST}$. Accordingly, when the test engine 335 calls replicated action 355, module A, $B^{TEST}$, and C can be sequentially executed.

The ghost log 320 can record the data relating to the replicated actions 355 and the operations of the test engine 355, thereby creating a log. The ghost log repository 340 can include a temporary storage buffer or a persistent data storage area. The ghost log 320 can be configured to record all activities relating to the associated host 305 or can be configured to record only selected activities. For example, in one embodiment, the ghost log 320 can record only activities considered errors in the replicated actions 355 or test failures of the test routines, thereby generating an error log. In another example, the ghost log 320 can record a statistically relevant portion of actions, such as recording data relating to every $n_{th}$ replicated action 355 or every $n_{th}$ test routine. The ghost log 320 can also capture system information and add annotations from this system information to the generated log.

For example, system clock information can be captured and used to annotate the time between receiving a replicated action 355 and the completion time for an associated active action 357. In another example, metadata information contained within message flows, such as input 350, and active action 357, can be recorded and/or utilized by the ghost log 320. Additionally, the ghost log 320 can time stamp data relating to replicated actions 355. The ghost log 320 can also record the log information in a ghost log repository 340.

If the ghost log repository 340 is external to the ghost agent 315, any of a variety of different mechanisms can be utilized to convey the log data to the ghost log repository 340. For example, an intermittent communication link, such as a unicast or a point-to-point communication link can be established between the ghost log 320 and the ghost log repository 340 through which data can be conveyed. In another example, a buffer space, which can be another embodiment of ghost log 320, within the ghost agent 315 can record log information. Whenever the buffer reaches a specified volume of data, a message containing the buffered information can be conveyed to the ghost log repository 340. The buffer within the ghost agent 315 can then be cleared and used to store fresh data.

In yet another example, ghost agents 315 can convey log data to a local data server. The local data server can then convey all received log data to the ghost log repository 340 from time to time or on a periodic basis. In still another example, the ghost agent 315 can intermittently deposit log data to a local location. Then a data-reaping object can gather packets of the log data that have been locally deposited by the various ghost agents 315. The packets of log data can be conveyed to the ghost log repository 340 by the data-reaping objects.

The ghost identifier 325 can provide identification, authorization, and security related functions for the ghost agent 315. That is, the ghost identifier 325 can identify the ghost agent 315 to the various components of the grid environment 300. Accordingly, servers in the grid environment 300 can have an awareness of the ghost agent 315. The grid servers can then use policy-based controls to manage permissions, authentication, resource utilization, and security for the ghost agents 315. Ghost agents 315 adhering to the established policies can be permitted to automatically enter and exit the various grids of the grid environment 300.

The ghost agent 315 can be granted different access privileges to computing resources as the ghost agent 315 traverses from one grid in a grid environment 300 to another depending on grid-based policies. Privileges afforded the ghost agent 315 can be determined in any manner known in the art. For example, a ghost agent 315 can replicate the passwords provided by the host 305 and use the replicated passwords to provide authentication to the grid environment 300. In another example, before a ghost agent 315 can be permitted to follow an associated host 305 from one grid in the grid environment 300 to the next, a password or digital certificate unique to the ghost agent 315 can be required. The ghost agent 315 can receive the same system privilege level with the grid environment 300 as the host 305 or can receive a different privilege level.

The ghost controller 330 can manage the ghost agent 315. For example, the ghost controller 330 can establish a life span for a particular ghost agent 315 so that the ghost agent 315 self-terminates after a designated period. In another example, the ghost controller 330 can restrict the computing resources consumed by the ghost agent 315, thereby freeing up system resources in the grid environment 300 for improved operational performance. Alternately, the ghost controller 330 can increase the computing resources consumed by the ghost agent 315, thereby slowing down operational performance in the grid environment 300. Slowing performance can be beneficial when simulating a load during testing.

In one embodiment, the ghost controller 330 can accept control signals 360 from an external source. Further, the ghost controller 330 can include a listener object capable of responding to particular events broadcasted by a corresponding notifier object. For example, a server could broadcast a signal causing all ghost controllers 330 to limit the resource consumption of all ghost agents 315 presently disposed in the server. Similarly, a grid wide broadcast could cause specified ghost agents 315 to self-terminate.

While ghost log repository 340 is depicted as being external and possibly remotely located from the ghost agent 315, it should be appreciated that the ghost log repository 340 can also be an allocated memory space internal to the ghost agent 315. For example, the ghost log repository 340 can be a dynamically allocated segment of random access memory (RAM) available to the ghost agent 315 as needed.

It should be noted that there are many possible ways to implement the elements of system 300. Implementation details can depend upon the conditions of the host 305, the specifics of the ghost agent 315, and details concerning the grid environment 300 itself. One of ordinary skill in the art can apply the teachings disclosed herein to a variety of different conditions using well known software engineering techniques and principles.

For example, the details of the test engine 335 can depend upon implementation choices. In one embodiment, the host 305 can execute actions A, B, and C by calling three separate external routines; call A, call B, and call C, respectively. The ghost agent 315 can determine the routine calls by examining the replicated actions 355 that correspond to the calling actions. In one arrangement, drivers and stubs can be written for call A, call B, and call C. The drivers and stubs can be executed by the test engine 335 so that the test engine 335 need not externally call routines A, B, and C. In another arrangement, the test engine 335 can perform calls to the external routines, but an indicator can be relayed to the external routines to prevent operational changes from occurring. That is, each of the external routines can be executed in a disabled mode. In yet another arrangement, substitute routines for routines A, B, and C can exist and be called by the test engine 335 in place of calling A, B, and C. For instance, the substitute routines can be implemented within a test environment and can be approximately equivalent to their counterparts that are implemented within a production environment. In another arrangement, the host 305 can execute actions A, B, and C using internal routines. The internal routines will generate actions that are copied into the ghost agent 315 as replicated actions and can be directly executed by the test engine 335.

Figure 4:
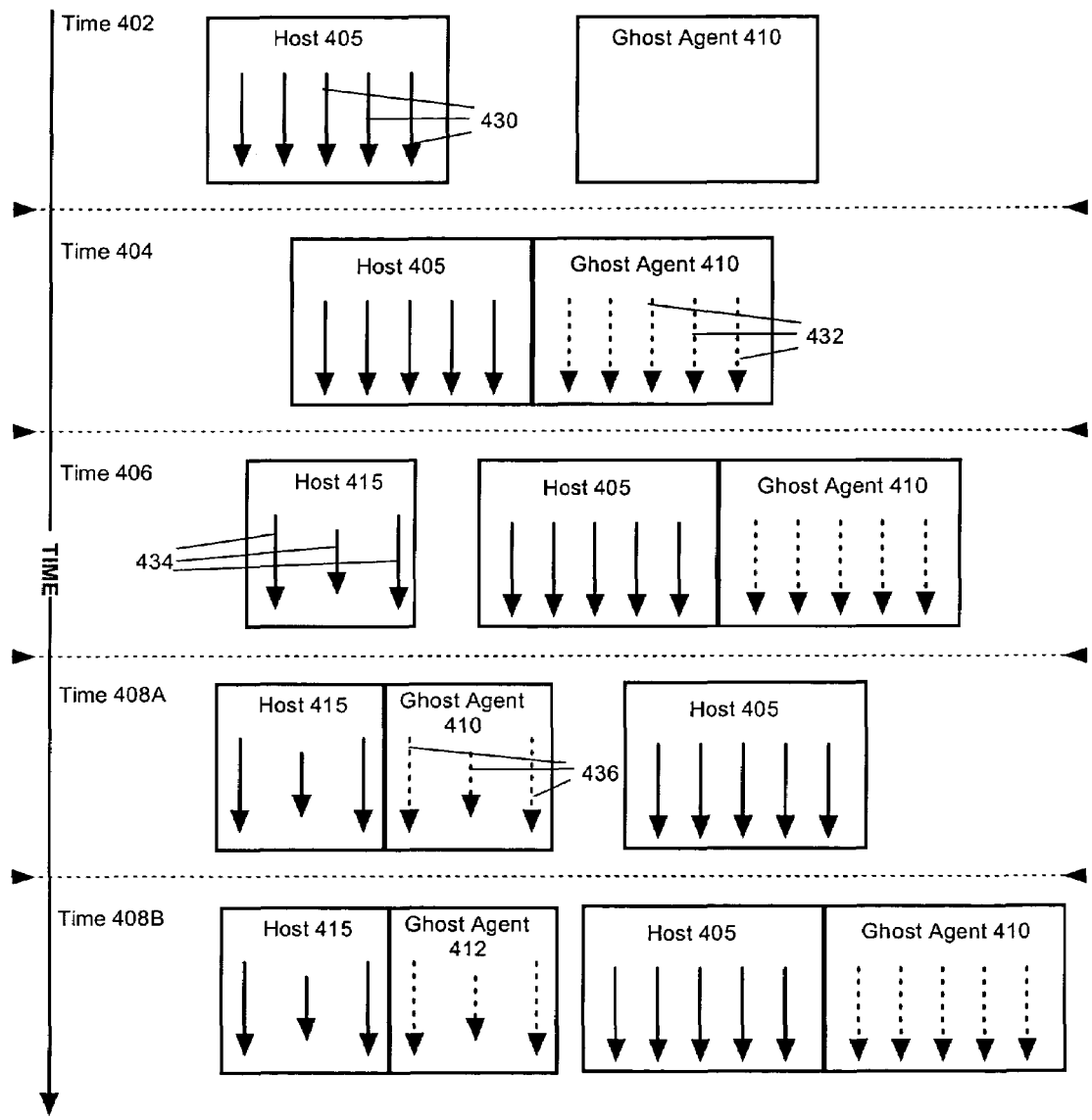
FIG. 4 is a schematic diagram illustrating the interaction between hosts and ghost agents over time in accordance with the inventive arrangements disclosed herein.

FIG. 4 is a schematic diagram illustrating the interaction between hosts and ghost agents over time in accordance with the inventive arrangements disclosed herein. The interaction can begin at time 402 with an unassociated ghost agent 410 and a host 405 executing host actions 430. At time 404, the ghost agent 410 can associate itself with the host 405. During this association process, each host action 430 within the host 405 can be replicated within the ghost agent 410 as a ghost action 432. Further, anytime a new action is initiated within the host 405, the new action can be replicated to be used by the associated ghost agent 410.

At time 406, an interaction between host 405 and host 415 executing actions 434 can occur. This interaction can trigger either a transfer of the ghost agent 410 or a cloning of the ghost agent 410, wherein time 408A illustrates the results of an exemplary transfer action and time 408B illustrates the results of an exemplary cloning action.

At time 408A, the ghost agent 410 can be transferred from host 405 to host 415. For example, the ghost agent 410 can be first disassociated with host 405. The disassociation causes the ghost agent 410 to stop replicating actions of the host 405. Then the ghost agent 410 can be associated with host 415. During the association, the actions 434 can be replicated within ghost agent 410 resulting in ghost actions 436. Accordingly, the actions now recorded by the ghost agent 410 and placed within a ghost log repository are based upon host 415 and are not based upon host 405. In another example, the ghost agent 410 can be replicated and attached to the host 415. Once replicated, the original ghost agent 410 associated with the host 405 can be deleted.

At time 408B, the ghost agent 410 can be cloned resulting in the creation of ghost agent 412, which is a copy of ghost agent 410. Ghost agent 412 is then associated with host 415. During the association, the actions 434 can be replicated 436 within ghost agent 412. Accordingly, the actions for both host 405 and host 415 can be recorded by respective ghost agents 410 and 412 and thereafter placed in the ghost log repository for logging purposes.

It should be noted that ghost agents 410 and 412 can be self-managing, self-identifying software objects capable of performing predefined tasks in a self-sufficient manner. For example, the ghost agents 410 and 412 can be programmed to seek a host of a specified type, to track a desired host from one grid location to another within a grid environment, to move from one grid in a grid environment to another, and/or to associate with hosts. In another example, the ghost agents 410 and 412 can be programmed to clone and attach themselves whenever a predetermined condition occurs, such as whenever a user object of a particular type is encountered.

The ghost agents 410 and 412 can also exchange information between themselves. For example, ghost agent 410 and ghost agent 412 can convey messages, records, and individual replicated actions to each other. Notably if ghost agent 410 and ghost agent 412 are disposed in different grids and if each was to move to the other's grid, the swapping of information between the two ghost agents 410 and 412 can be performed in lieu of moving each ghost agent.

In particular embodiments, each grid in a grid environment can contain a number of "blank" ghosts. "Movement" of a ghost from a first grid to a second grid can actually be performed by transferring the information from the "moving" ghost in the first grid to the "blank" ghost in the second grid. The "moving" ghost, now emptied of content, can be treated as a "blank" ghost for the first grid.

Figure 5:
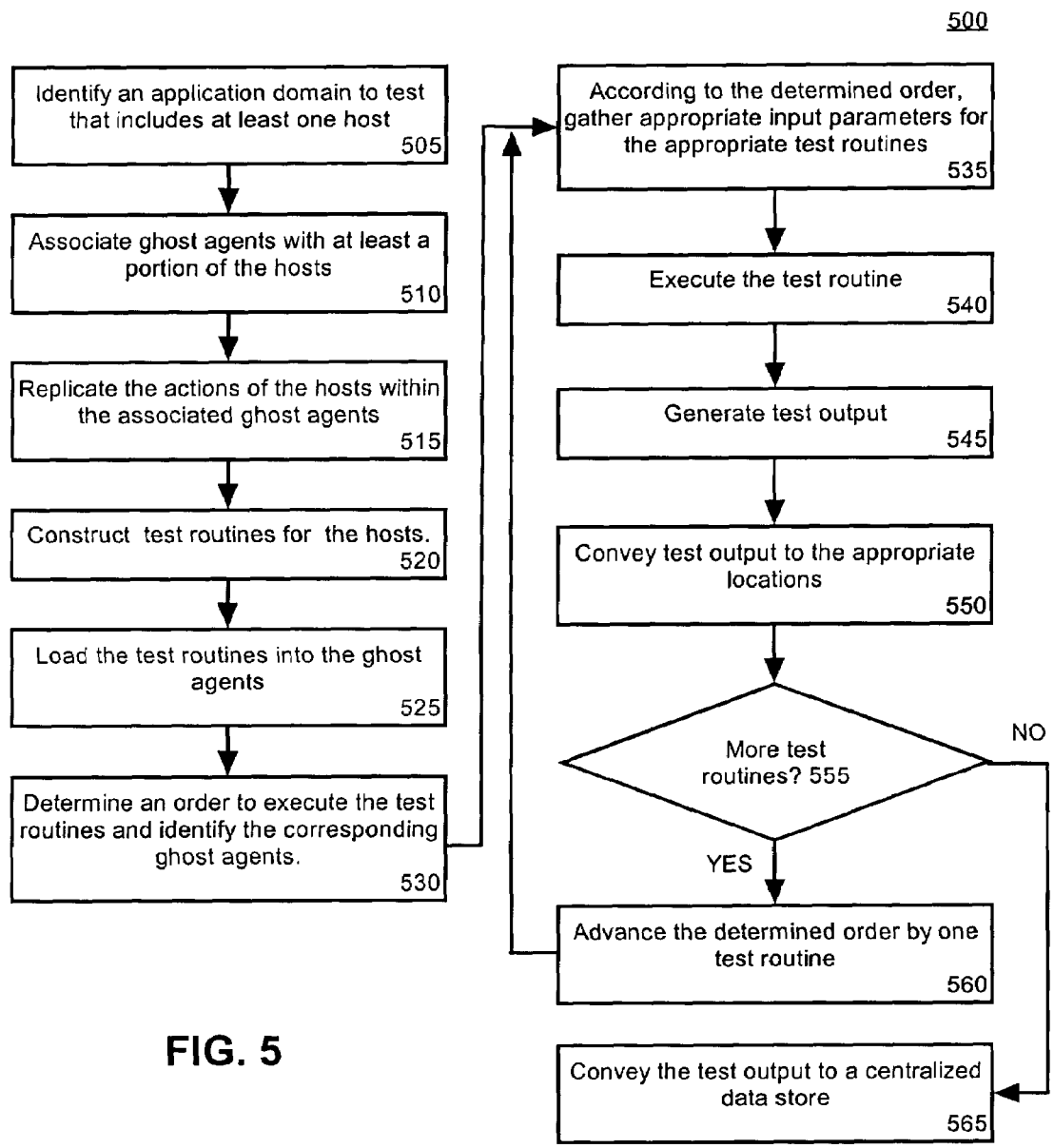
FIG. 5 is a flow chart illustrating a method for testing applications using ghost agents in accordance with the inventive arrangements disclosed herein.

FIG. 5 is a flow chart illustrating a method 500 for testing applications using ghost agents in accordance with the inventive arrangements disclosed herein. The method 500 can be performed in the context of an application domain residing within a grid environment. The application domain can include multiple application components located in different locations within the grid environment. The method 500 can begin in step 505, where an application domain can be identified for testing. This identification can be a manual or an automated process. In step 510, ghost agents can be associated with at least a portion of the hosts that are included in the identified application domain. In step 515, the actions performed within the hosts can be replicated to be used by the associated ghost agents. In step 520, test routines can be constructed. In step 525, the test routines can be loaded into the ghost agents.

In step 530, an execution order for executing a series of related test routines can be determined. Additionally, ghost agents corresponding to each of the test routines can be identified. For example, a test conducted by a centralized test application can sequentially execute several test routines located within different ghost agents. The test application can convey test commands and/or parameters between the appropriate ghost agents to assure that the proper test routines are executed in the proper order and that the test routines are based upon the proper input parameters. It should be noted that multiple test routines can be executed within a single ghost agent that moves from host to host. Additionally, multiple test routines can be executed by multiple ghost agents, where each ghost agent executes one or more test routines.

In step 535, the appropriate input parameters can be determined for the appropriate test routine. Input parameters can be derived from replicated actions, from output from other related test routines, and from external messages. Since different test routines can be dependant upon the execution of other test routines and/or the execution of replicated actions, the gathering of appropriate input parameters may be time dependant. In step 540, the identified test routine can be executed. In step 545, test output for the test routine can be generated. In step 550, the test output can be conveyed to appropriate locations. If the test output is required by other test routines, the output can be conveyed to the ghost agents that depend upon it. Additionally, the test output can be conveyed to a storage location that records test output. The storage location can be either local to the ghost agent or can be an external storage location.

In step 555, the determined order of test routines can be searched to discover whether any unexecuted test routines remain. If so, the method can proceed to step 560, where the determined order can be advanced by one test routine. The method can then proceed to step 535 where input parameters for the most current test routine can be gathered. If no more routines remain as determined by step 555, the method can proceed to step 565, where locally stored test output can be conveyed to a centralized data store.

Figure 6:
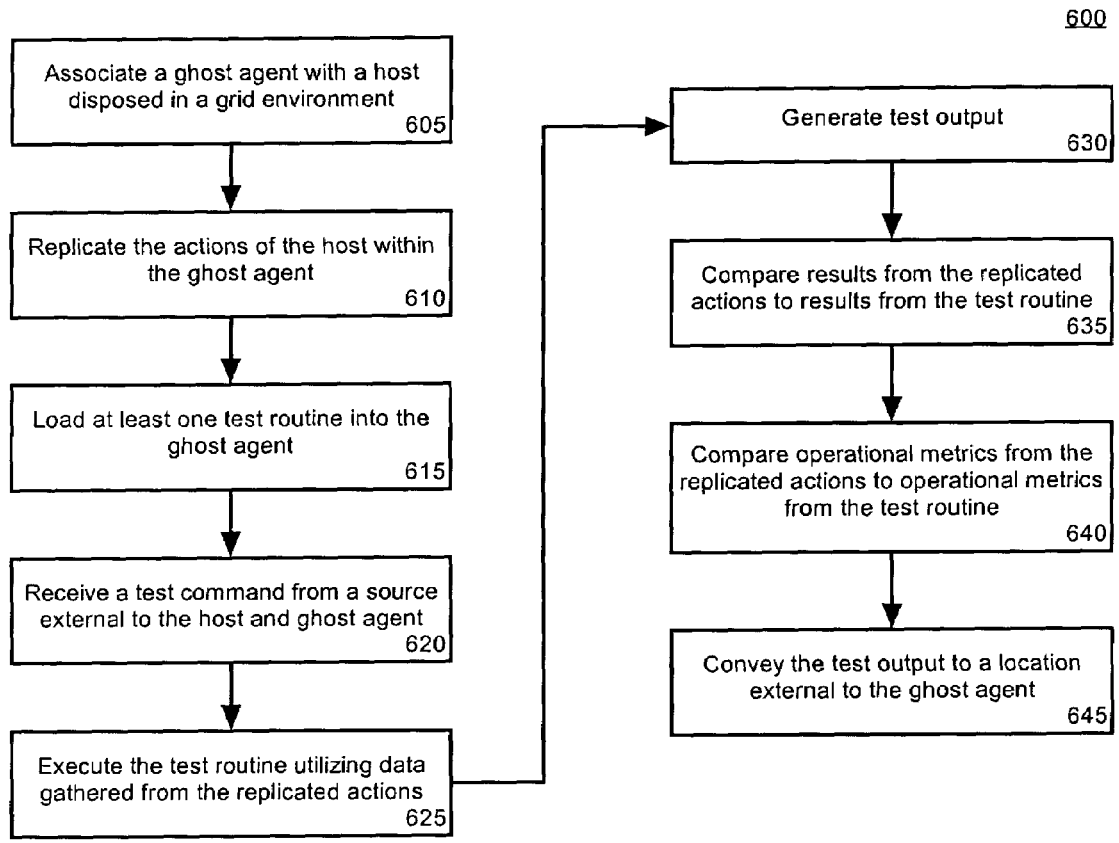
FIG. 6 is a flow chart of an exemplary method for executing test routines within a ghost agent in accordance with the inventive arrangements disclosed herein.

FIG. 6 is a flow chart of an exemplary method 600 for executing test routines within a ghost agent in accordance with the inventive arrangements described herein. The method 600 can begin in step 605, when a ghost agent is associated with a host. In step 610, the actions of the host can be replicated within the ghost agent. In step 615, at least one test routine can be loaded into the ghost agent. In step 620, the ghost agent can receive a test command from a test application. In one embodiment, the external source can send a command directly to the ghost agent. In another embodiment, the external source can trigger the host to execute an action and that action can be replicated within the ghost agent triggering a test routine. In step 625, a test routine can be executed. This execution can depend upon data gathered from replicated actions as previously detailed.

In one embodiment, a test routine can direct a ghost agent to execute a sequence of actions mimicking a user. For example, if a user of a grid-based spreadsheet program performs a search operation, the host can receive search input and perform search actions. A ghost agent can mimic the search input and can perform similar search actions to those performed by the host. When the ghost agent performs a search, however, test commands and test routines can be executed in place of and in addition to the routines.

In step 630, test output for the executed test routine can be generated. In step 635, results form the replicated actions can be compared to results from the test routine. For example, the test routine can be a direct replacement for an action currently being performed by the host. The ghost agent can execute both the test routine and the corresponding replicated action. Moreover, in step 640, operational metrics from the replicated actions can be compared with operational metrics from the test routine. Operational metrics refer to performance and/or load metrics. Accordingly, an execution time for performing the test routine can be compared to an operational time required for performing the replicated actions. Alternatively, the amount of resources consumed by the test routine can be compared to the resource consumption of the corresponding replicated actions. In step 645, test output can be conveyed to a location external to the ghost agent.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A testing method comprising the steps of:
identifying a host within a grid environment having at least one application domain, wherein said host is a software object that implements at least one feature of said application domain;
associating a ghost agent with said host, wherein said ghost agent is a software object that includes at least one test routine written specifically for said host and does not implement any feature of said application domain;
replicating actions of said host within said ghost agent;
executing the at least one test routine within said ghost agent, wherein said executing step utilizes data gathered from said replicated actions, and wherein said test routine tests at least a portion of a specific application;
testing said specific application using said ghost agent while simultaneously simulating load conditions resulting from at least one different application;
generating test output for said test routine;
moving said host within said grid environment; and
responsively moving said ghost agent in accordance with movement of said host.

2. The method of claim 1, further comprising the step of:
preventing said test routines from operationally executing in said grid environment.

3. The method of claim 1, further comprising the steps of:
identifying a location for recording test output that is external to said ghost agent; and,
conveying said test output to said identified location.

4. The method of claim 1, further comprising the steps of:
receiving a test command from a source external to said host and external to said ghost agent; and,
performing at least one operation with said ghost agent responsive to said test command.

5. The method of claim 1, further comprising the step of:
comparing results from said replicated actions with results from said executing of said test routines.

6. The method of claim 1, further comprising the step of:
comparing operational metrics from said replicated actions with operational metrics from said executing of said test routines.

7. The method of claim 1, further comprising the steps of:
selecting a plurality of hosts; and,
for each selected host, repeating said associating step, said replicating step, said executing step, and said generating step.

8. A testing method comprising the steps of:
identifying an application domain comprising hosts disposed within a plurality of locations within a grid environment, wherein each said host is a software object that implements at least one feature of said application domain;
providing a plurality of test routines, wherein each test routine is written for a specific host;
inputting said test routines into a corresponding one of a plurality of ghost agents, wherein each said ghost agent is a software object that does not implement any feature of said application domain;
associating each of said ghost agents with said host that corresponds to said inputted test routine;
executing said test routines, wherein said test routines test at least a portion of a specific application;
testing said specific application using said ghost agents while simultaneously simulating load conditions resulting from at least one different application;
moving said host within said grid environment; and
responsively moving said ghost agent in accordance with movement of said host.

9. The method of claim 8, further comprising the steps of:
generating test output based upon said executing step; and,
conveying said test output to a centralized data store.

10. The method of claim 8, further comprising the steps of:
providing a test interface for testing said application domain; and,
triggering said executing step using said test interface.

11. The method of claim 8, further comprising the steps of:
for each host, replicating actions of said host to be used by said associated ghost agent; and,
comparing aspects of said executed test routines with aspects of said replicated actions.

12. The method of claim 8, further comprising the steps of:
determining a sequence in which said test routines are to be executed; and,
performing said executing step in accordance with said determined sequence.

13. The method of claim 8, further comprising the step of:
conveying at least one message between one of said ghost agents and another of said ghost agents.

14. The method of claim 13, wherein said ghost agent sending said message generates said message by executing said inputted test routine.

15. The method of claim 13, wherein said ghost agent receiving said message extracts data from said message, wherein said extracted data is used as input for said inputted test routine.

* * * * *